US008769706B2

(12) United States Patent
Deng et al.

(10) Patent No.: US 8,769,706 B2
(45) Date of Patent: Jul. 1, 2014

(54) SYSTEM AND METHOD FOR USER TO VERIFY A NETWORK RESOURCE ADDRESS IS TRUSTED

(75) Inventors: Hong Deng, Poughkeepsie, NY (US);
Jodi E. Everdon, Saugerties, NY (US);
Colette A. Manoni, Brewster, NY (US);
Renata Rand McFadden, Clinton Corners, NY (US); Jennifer A. Thompson, Kingston, NY (US)

(73) Assignee: International Business Machines Corporation, Armonk, NY (US)

( * ) Notice: Subject to any disclaimer, the term of this patent is extended or adjusted under 35 U.S.C. 154(b) by 1596 days.

(21) Appl. No.: 11/828,619

(22) Filed: Jul. 26, 2007

(65) Prior Publication Data

US 2009/0031033 A1    Jan. 29, 2009

(51) Int. Cl.
*G06F 7/04* (2006.01)

(52) U.S. Cl.
USPC ............... 726/29; 726/26; 726/27; 726/28; 726/30; 713/182; 713/183; 713/184; 713/185

(58) Field of Classification Search
USPC .............................. 726/26–30; 713/182–186
See application file for complete search history.

(56) References Cited

U.S. PATENT DOCUMENTS

| 7,100,049 | B2  |   | 8/2006  | Gasparini et al. ............. 713/170 |
|-----------|-----|---|---------|---------------------------------------|
| 7,797,413 | B2  | * | 9/2010  | Adelman et al. .............. 709/223  |
| 2001/0021978 | A1 |   | 9/2001  | Okayasu et al.                        |
| 2002/0116525 | A1 |   | 8/2002  | Peters et al.                         |
| 2002/0159601 | A1 |   | 10/2002 | Bushmitch et al.                      |
| 2006/0026246 | A1 | * | 2/2006  | Fukuhara et al. ............. 709/206  |
| 2006/0147038 | A1 | * | 7/2006  | Allain et al. .................. 379/457 |
| 2007/0156900 | A1 | * | 7/2007  | Chien ........................... 709/225 |
| 2007/0245422 | A1 | * | 10/2007 | Hwang et al. .................. 726/26  |
| 2008/0086555 | A1 | * | 4/2008  | Feinleib ........................ 709/224 |
| 2008/0141342 | A1 | * | 6/2008  | Curnyn ........................... 726/3  |
| 2008/0148049 | A1 | * | 6/2008  | Moore et al. .................. 713/167  |
| 2008/0299970 | A1 | * | 12/2008 | Roberts ....................... 455/435.1 |

OTHER PUBLICATIONS

Dai et al., A New Method to Detect Abnormal IP Address on DHCP, 2007, IEEE, TENCON 2007—2007 IEEE Region 10 Conference, pp. 1-5.*
Jesi et al., Identifying Malicious Peers Before It's Too Late: A Decentralized Secure Peer Sampling Service, 2007, First International Conference on Self-Adaptive and Self-Organizing Systems (SASO 2007), pp. 1-10.*
Microsoft IE Phishing Filter, http://www.microsoft.com/mscorp/safety/technologies/antiphishing/at_glance.mspx, pp. 1-4 (Oct. 28, 2006).
Introducing Windows CardSpace, David Chappell, http://msdn2.microsoft.com/en-us/library/aa480189.aspx, pp. 1-12 (printed Apr. 6, 2007).

* cited by examiner

*Primary Examiner* — Luu Pham
*Assistant Examiner* — Roderick Tolentino
(74) *Attorney, Agent, or Firm* — Ido Tuchman; Libby Z. Toub

(57) ABSTRACT

A system, method and computer program product for a user to verify that a network resource address is trusted. At least one entity registration is stored at a server. Each entity registration comprises an identity of an entity and entity addressing information associated with the identity of the entity. The existence of at least one entity whose identity is included in the at least one entity registration is confirmed. A query comprising a target addressing information is received from a client. If the target addressing information matches the entity addressing information, the identity of the entity associated with the entity addressing information is determined and a result comprising the identity of the entity associated with the entity addressing information matching the target addressing information is transmitted to the client. If no entity addressing information matches the target addressing information, an indication of such is transmitted to the client.

15 Claims, 10 Drawing Sheets

URL VERIFICATION

404 — YOU HAVE REQUESTED THE FOLLOWING URL:

406 — http:/www.ibm.com/

THE WEBSITE AT THIS URL IS OPERATED BY THE FOLLOWING ENTITY:

408 — INTERNATIONAL BUSINESS MACHINES CORPORATION

DO YOU WISH TO ACCESS THIS WEBSITE?

412 — YES    NO — 414

410 — ☑ REMEMBER MY DECISION AND APPLY MY DECISION TO ALL WEBSITES OPERATED BY THIS ENTITY.

SYSTEM AND METHOD FOR USER TO VERIFY A NETWORK RESOURCE ADDRESS IS TRUSTED

FIELD OF THE INVENTION

The present invention relates generally to computer security. More specifically, the present invention relates to techniques for verifying that the identity string associated with a network resource address is trusted to reduce the risk of phishing and other security risks.

BACKGROUND

The Internet is a well-known computing network with a worldwide scope. Originally, the Internet was used primarily for research and education. In recent years, the Internet has seen rapid growth. As of 2007, most households in the United States and many users worldwide have access to the Internet at home. Additionally, the Internet has evolved to facilitate a broad range of uses, including commerce, access to government services, personal communication and entertainment.

The Internet allows a wide variety of computing systems and other technological devices to communicate with each other. A computing system or other technical device connected to the Internet is known as a host. The Internet connects numerous distinct networks according to a standardized communication protocol known as the Internet Protocol. While the individual networks themselves are heterogeneous, employing a common protocol allows them to interconnect. In this manner, computing systems and other technological devices can communicate with each other even if they are located on different networks. Currently, a version of the Internet Protocol known as "IPv4" is predominantly used on the Internet. However, a newer version known as "IPv6" is becoming increasingly widely used.

A host is identified by an Internet Protocol address, commonly known as an IP address. In IPv4, an IP address is simply a 32-bit number. An IP address is customarily divided into four eight-bit segments, with the segments arranged so that the most significant segment is to the left. Each segment is expressed in base 10, and the four segments are separated by periods. For example, "129.42.58.212" is an IP address expressed in the customary format. In IPv6, an IP address is a 128-bit number.

Typically, a contiguous range of IP addresses is assigned to an organization. Generally, this is achieved by assigning to the organization all IP addresses which begin with a specific prefix. The prefix defines both the number of bits which must match and the values which they must contain in order to match. This method beneficially improves routing efficiency because a message to a host whose IP address begins with a specific value can be routed to a specific organization. The organization is then responsible for routing the message to the appropriate host. Thus, the message sender does not require any knowledge of the internal workings of the organization's network. For example, the set of IP addresses whose first 8 bits are decimal 9 is associated with International Business Machines Corporation. Therefore, any IP address whose first 8 bits are decimal 9 is routed to International Business Machines Corporation. In most cases, a human user may access a device by directly entering an IP address. However, IP addresses are clearly difficult for a human being to memorize. Therefore, hosts may also be accessed by a domain name. Domain names are human-readable names which consist of one or more elements separated by periods. Each element is a string which may generally contain only alphanumeric characters, digits and hyphens. An example of a domain name is "ibm.com", which is associated with International Business Machines Corporation.

The domain name system is hierarchically structured. The rightmost element of a domain name, known as a top-level domain (TLD), generally denotes either a type of organization or a country. For example, commercial entities typically end in ".com", educational institutions in ".edu", not-for-profit organizations in ".org" and entities in Japan in ".jp". Virtually any domain may include a subdomain. A subdomain expresses a more specific level of structure than is expressed by its parent domain. The domain name of a subdomain is the domain name of the parent domain with one additional element added to the left. For example, "ibm.com" is a subdomain of the "com" TLD. Most organizations have a domain name which is either a subdomain of a TLD or a subdomain of a subdomain of a TLD. Within a domain name representing a specific organization, additional levels of subdomains may indicate specific systems belonging to the organization or specific subdivisions of the organization. For example, "www.ibm.com", a domain name which is a subdomain of "ibm.com", is the server of the main website of International Business Machines Corporation. Additionally, "ch.ibm.com", a domain name which is another subdomain of "ibm.com", represents IBM Schweiz, the Swiss division of International Business Machines Corporation.

To access an Internet host according to its domain name, the domain name is first converted to an IP address. This is generally achieved by querying one or more Domain Name Servers, special servers configured to convert domain names to IP addresses. The host is then accessed according to its IP address. For example, to access a service at "www.ibm.com", the domain name "www.ibm.com" would first be translated to the IP address "129.42.58.212".

Multiple domain names may be associated with the same IP address. This fact beneficially allows a method known in the art as virtual hosting. In virtual hosting, a single server hosts a plurality of services. Each service typically executes under a separate domain name. The server may be identified by a single IP address, in which case all domain names hosted at the server are associated with the same IP address. Virtual hosting is advantageous for small businesses which do not require a dedicated server because it costs less than dedicated hosting. Nonetheless, virtual hosting means that a specific IP address is not necessarily associated with a unique domain name. Other Internet hosts must therefore account for this possibility.

The Internet offers a variety of types of services. One particularly well-known service is the World Wide Web, commonly known as the "web". The World Wide Web is a method of accessing information. The World Wide Web is subdivided into individual websites, each of which has one or more pages. Each page is accessed via a Uniform Resource Locator (URL). A URL generally specifies a domain name of a host at which a website is located and optionally specifies path information for a specific page within that website. For example, the About Us page of the International Business Machines Corporation's primary website is accessed via the URL "http://www.ibm.com/ibm/us/". "www.ibm.com" identifies a specific host, and "/ibm/us/" identifies a specific page located at that host.

World Wide Web pages are commonly coded in Hypertext Markup Language (HTML). HTML includes a feature known as forms which allows data to be transmitted to a website. This functionality allows completing transactions, such as purchasing items from an online store, via the World Wide Web. Additionally, technologies have been developed to allow a World Wide Web page to cause program code to execute at a client. Examples of such technologies include JavaScript™, Java™ and ActiveX®. Java and JavaScript are trademarks of Sun Microsystems, Inc., Santa Clara, Calif., United States in the United States or other countries. ActiveX is a registered trademark of Microsoft Corporation, Redmond, Wash. United States in the United States and other countries.

Another well-known service is electronic mail, commonly known as e-mail. E-mail allows sending a message to another user which may be received at the recipient's convenience. E-mail messages are generally textual in nature, although most e-mail systems allow attaching other types of data to an e-mail message. The sender and recipients of e-mail are identified by e-mail addresses. An e-mail address is generally expressed in the form <user_name>@<domain_name>, where <domain_name> is a domain name and <user_name> identifies a specific user at that domain name. It is noted that the domain name of the sender's e-mail address is not inherently required to match the domain name of the host actually used to send the message. This is advantageous because a user may not actually be located at the organization they are associated with. For example, an employee of International Business Machines Corporation should ideally be able to send messages from an "@ibm.com" address even if he or she is waiting for a flight at Newark Liberty International Airport. Nonetheless, this fact increases the risk that the identity of the sender of an e-mail address can be forged.

While the Internet has provided many benefits to individuals, businesses and society, it unfortunately also provides drawbacks and security risks. One common type of security risk is the computer virus. A computer virus is a computer program which generally has harmful effects and which attempts to transmit itself to other computer systems. For example, a computer virus may attempt to infect as many other hosts as possible and to deliberately waste processor time on systems it has already infected. Another type of security risk is malware. Malware is a broad term for computer software which is deliberately configured to have harmful effects. For example, a computer program may purport to be a computer game but may actually destroy data once executed. While not a security risk per se, spam is one of the most common nuisances on the Internet. Spam is a broad term for e-mail messages of a commercial nature which are sent to a large number of users who had not requested the messages. Spam is disadvantageous because it consumes a significant quantity of computing resources. Spam must also frequently be manually deleted, which costs people a significant amount of time.

Phishing is an Internet security threat which is particularly dangerous and which is increasing in prevalence. Phishing is any of a class of attacks which attempt to deceive Internet users into revealing sensitive information such as login names, passwords and credit card numbers to an attacker. One common form of phishing attacks attempts to steal a user's online identity by sending fraudulent or "spoofed" e-mail messages which purport to originate from a valid company. The e-mail messages contain hyperlinks to a counterfeit website which is designed to resemble the website of a legitimate business. In many cases, the forgery looks identical or nearly identical to the legitimate website. Thus, it is difficult for most users to identify the website as counterfeit. The counterfeit website prompts the user to enter sensitive information. Because many users failed to identify the website as counterfeit, they are likely to enter the requested information. After receiving the sensitive information, the counterfeit website may then redirect the user to the actual website of the legitimate business to conceal the attack. The attacker may then fraudulently use the sensitive information to commit offenses such as wire fraud, credit card fraud and identity theft. It is noted that even if a low percentage of intended victims actually provide the sensitive information, the attacker can obtain a large quantity of sensitive information. For example, suppose an attacker sends 10,000 e-mail messages advising that a credit card number must be supplied within 48 hours for identification purposes or the recipient's bank account will be closed. Even if only 5% of recipients fall for the scam, the attacker still obtains 500 credit card numbers.

Phishing is a widespread and increasing problem on the Internet. According to "Phishing Activity Trends: Report for the Month of February, 2007" by the Anti-Phishing Working Group, there were 23,610 unique phishing reports involving 16,463 unique phishing sites in February 2007. <Apr. 27, 2007: http://www.antiphishing.org/reports/apwg_report_february_2007.pdf> By contrast, only 17,163 unique phishing reports involving 9,103 unique phishing sites were reported in February 2006. In February 2007, 25.4% of observed phishing attempts contained some form of target name in their URL, and 17% contained only an IP address with no hostname. Id. This data implies that even users who check the properties of the URL can be deceived by phishing attacks. Furthermore, many users are unaware of how to check the properties of the URL or are unaware that it is desirable to do so. Such users are particularly at risk of being victimized by phishers.

Historically, phishing attacks have been predominantly directed at major corporations and financial institutions. In response, these companies have developed complex countermeasures. One notable countermeasure is secondary verification. In secondary verification, a mechanism in addition to the industry-standard username and password is required in order to authenticate. For example, legitimate users may be given a technological device which generates a numeric token which changes at regular intervals. The user must supply the correct token in order to successfully authenticate. Furthermore, the token will be valid only for a very short period of time. While this approach increases the security of authentication in general, it is limited in its ability to combat phishing. This is because a phishing website can simply submit the token along with the username and password to the legitimate website to confirm its accuracy.

Another countermeasure commonly used in the art is user education. Many businesses are counteracting phishing by educating their customers never to click a hyperlink but to instead to always directly enter the address of the target website. Unfortunately, most Internet users' first reaction to an e-mail containing a hyperlink is to click on the hyperlink. Upon doing so, the user is unknowingly redirected to the counterfeit website. While this advice is useful to many users, it encourages users to take an overt action which they are not used to taking. As a result, many users are tricked into accessing the counterfeit website and providing sensitive information despite this advice.

Customers are also educated not to believe "urgent" e-mail messages which prompt for security information. Unfortunately, such messages frequently provoke an emotional response in users which causes them to panic and to follow the directions in the message despite having been educated not to do so.

Customers are also educated to frequently examine their financial accounts to check for discrepancies. Unfortunately, discrepancies resulting from financial crime or identity theft are only evident once the act has already occurred. Therefore, this advice is clearly of limited use in proactively preventing phishing attacks.

Although these countermeasures have significant limitations, they nonetheless are somewhat effective in counteracting phishing. As a result, in response to these countermeasures, phishing attacks have been increasingly targeting smaller businesses. This is problematic because smaller businesses may not have the resources to effectively counteract phishing attacks. Furthermore, phishing attempts have generally been increasing in sophistication over time, making them inherently more difficult to counteract.

More generally, these countermeasures must be implemented independently by each organization. This drawback is exacerbated by the fact that these countermeasures are expensive to implement. Clearly, it is ineffective for each organization to independently implement expensive phishing countermeasures.

SUMMARY OF THE INVENTION

The present invention addresses the above-mentioned limitations of the prior art by introducing improved methods for a user to verify that a network resource address is trusted.

One notable aspect of the present invention is a method for a user to verify that a network resource address is trusted. The method comprises storing at a server at least one entity registration. Each entity registration comprises an identity of an entity and entity addressing information associated with the identity of the entity. The method further comprises confirming the existence of at least one entity for which the identity is included in the at least one entity registration. The method further comprises receiving from a client a query comprising a target addressing information. The method further comprises determining the identity of the entity associated with the entity addressing information if the target addressing information matches the entity addressing information. The method further comprises transmitting to the client a result comprising the identity of the entity associated with the entity addressing information matching the target addressing information. The method further comprises transmitting to the client an indication that no entity is associated with the target addressing information if no entity addressing information matches the target addressing information.

Another notable aspect of the present invention is a system for a user to verify that a network resource address is trusted. The system comprises a server. The server comprises a storage unit configured to store at least one entity registration. Each entity registration comprises an identity of an entity and entity addressing information associated with the identity of the entity. The server further comprises a query receiving unit configured to receive from a client a query comprising a target addressing information. The server further comprises a query processing unit configured to determine the identity of the entity associated with the entity addressing information if the target addressing information matches the entity addressing information. The server further comprises a query result transmitting unit configured to transmit to the client a result comprising the identity of the entity associated with the entity addressing information matching the target addressing information and to transmit to the client an indication that no entity is associated with the target addressing information if no entity addressing information matches the target addressing information. The system further comprises a confirmation unit configured to, for at least one entity registration, confirm the existence of the entity for which the identity is included in the entity registration.

Another notable aspect of the present invention is a computer program product embodied in a tangible media comprising computer readable program codes coupled to the tangible media for a user to verify that a network resource address is trusted. The computer readable program codes are configured to cause the program to store at a server at least one entity registration. Each entity registration comprises an identity of an entity and entity addressing information associated with the identity of the entity. The computer readable program codes are further configured to confirm the existence of at least one entity for which the identity is included in the at least one entity registration. The computer readable program codes are further configured to cause the program to receive from a client a query comprising a target addressing information. The computer readable program codes are further configured to cause the program to determine the identity of the entity associated with the entity addressing information if the target addressing information matches the entity addressing information. The computer readable program codes are further configured to cause the program to transmit to the client a result comprising the identity of the entity associated with the entity addressing information matching the target addressing information. The computer readable program codes are further configured to cause the program to transmit to the client an indication that no entity is associated with the target addressing information if no entity addressing information matches the target addressing information.

The foregoing and other features, utilities and advantages of the invention will be apparent from the following more particular description of various embodiments of the invention as illustrated in the accompanying drawings.

BRIEF DESCRIPTION OF THE DRAWINGS

FIGS. 4A, 4B, 4C and 4D demonstrate an exemplary user interface for a user to verify that a network resource address is trusted.

DETAILED DESCRIPTION OF THE INVENTION

Figure 1:
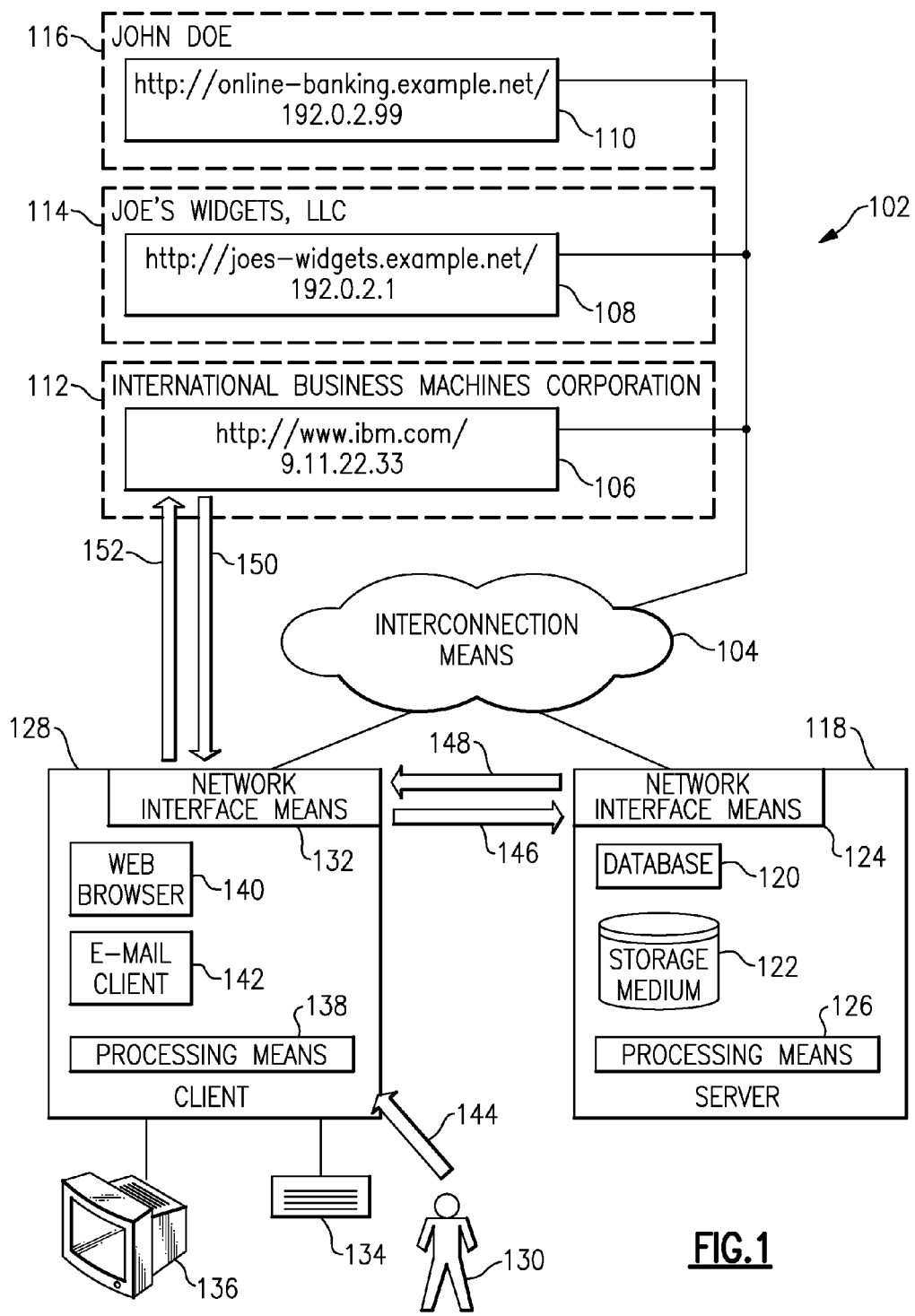
FIG. 1 shows an exemplary system for a user to verify that a network resource address is trusted as contemplated by the present invention.

The following description details how the present invention is employed to verify that a network resource address is trusted. Throughout the description of the invention reference is made to FIGS. 1-5. When referring to the figures, like structures and elements shown throughout are indicated with like reference numerals.

FIG. 1 shows an exemplary system 102 for a user to verify that a network resource address is trusted as contemplated by the present invention. In an embodiment of the present invention, a combination of a domain name and an IP address is considered to be trusted if it is registered and if it is verified to belong to an entity identified by an identity string. An identity string may be textual information identifying the entity, such as the name of a corporation or the name of an owner of a business. Additional elements may be required in order for an entity to be considered trusted.

The system 102 includes an interconnection means 104. The interconnection means may be any of a wide variety of systems known in the art for allowing distinct systems to communicate electronically. The interconnection means may comprise any of a wide variety of networks such as the Internet, the public switched telephone network (PSTN), local area networks (LAN's) and wide area networks (WAN's). The interconnection means may employ any of a wide variety of network technologies such as Wi-Fi®, WiMAX®, Ethernet, token ring, Digital Subscriber Line (DSL), cable Internet access, satellite Internet access, Integrated Services Digital Network (ISDN) and dial-up Internet access. Wi-Fi is a registered trademark of the Wi-Fi Alliance, Austin, Tex. United States. WiMAX is a registered trademark of the WiMAX Forum, Mountain View, Calif. United States. The interconnection means may comprise direct physical connections, radio waves, microwaves or any combination thereof. In the exemplary system of FIG. 1, the interconnection means 104 is the Internet. Thus, the interconnection means operates according to the TCP/IP protocol. As such, any host accessible via the interconnection means may be identified by an IP address, a domain name or both.

The system 102 further includes one or more resources 106, 108, 110. A resource may be any service or data accessible via the interconnection means 104. Resources may include web pages, electronic mail messages, files accessible via the File Transfer Protocol (FTP) and hosts which may be interactively accessed via the telnet and/or Secure Shell (ssh) protocols. It is emphasized that a resource need not passively wait on the network until it is accessed. For example, the resource may be an electronic mail message which is pushed to a recipient rather than being actively requested by the recipient.

A resource is located at a specific host. Thus, the addressing information used to access the resource comprises the addressing information required to access the host at which the resource is located. However, additional addressing information may be required in order to specify a precise resource within the host.

A resource 106, 108, 110 may be associated with an entity 112, 114, 116. The entity may have created the resource or may otherwise be responsible for its content. An entity may be a natural person, a business, a corporation, a limited liability company (LLC), a not-for-profit organization, a government agency or the like.

In the exemplary system of FIG. 1, the web page having the addressing information or URL "http://www.ibm.com/" is a resource 106. It is associated with the entity 112 known as International Business Machines Corporation. The web page having the URL "http://joes-widgets.example.com/" is also a resource 108. It is associated with the entity 114 known as Joe's Widgets, LLC, a legitimate small business which sells widgets via the Internet. The web page having the URL "http://online-banking.example.net/" is also a resource 110. It is associated with the entity 116 known as John Doe, a computer criminal who performs phishing attacks.

The system 102 further includes one or more servers 118. A server maintains information associating resources 106, 108, 110 with the identity of the entity 112, 114, 116 associated with each resource. Specifically, entity addressing information at which resources may be located is maintained. Entity addressing information may comprise a domain name, IP address or combination thereof. The identity of the entity may comprise an identity string. An identity string may contain textual information identifying the entity, such as the name of a corporation or the name of an owner of a business. The server is configured to respond to the queries by transmitting a result comprising the identity of the entity associated with the resource or by transmitting an indication that no entity is associated with the resource.

It is emphasized that a one-to-one correspondence need not exist between resources and entities. An entity may be associated with multiple resources. Conversely, a server may have no information about the identity of the entity with which a particular resource is associated. A server is configured to receive queries comprising the addressing information of a resource.

Before a server is updated to associate a resource 106, 108, 110 with an identity of the entity 112, 114, 116, the existence of the entity may be confirmed. The fact that entity addressing information associated with a resource belongs to the entity associated with the resource may be verified. As an additional precaution, further verification steps may be performed to ensure that the entity can be trusted.

Each server may be implemented in hardware, in software or a combination thereof. A server may be a general purpose computer. In this case, it is contemplated that the computer is configured specifically to process a large volume of queries. A server may be based on a general purpose operating system such as IBM® z/OS®, IBM® AIX®, Linux or Windows. IBM, z/OS and AIX are registered trademarks of International Business Machines Corporation, Armonk, N.Y. United States in the United States, other countries, or both. A server may also be a technological device manufactured specifically to implement the present invention.

A server 118 may include a database 120. A database is any of a variety of systems configured to store data and to retrieve data which is matched by a query. The database may be implemented in hardware, in software or in a combination thereof. The database may organize data according to any of a wide variety of paradigms, including without limitation the relational, hierarchical and object-oriented paradigms. The database may be a computer program product such as IBM® DB2® or MySQL®. DB2 is a registered trademark of International Business Machines Corporation, Armonk, N.Y. United States, in the United States, other countries, or both. MySQL is a registered trademark of MySQL AB, Uppsala, Sweden in the United States, the European Union and other countries.

A server 118 may comprise a storage medium 122 configured to store data in a computer readable format. The storage medium 122 may be any of a variety of technological devices configured to store data, including without limitation hard drives and random access memory (RAM.) A server may also include a network interface means 124. The network interface means may be any of a variety of technological devices configured to allow the server to receive data from the interconnection means 104 and to transmit data to the interconnection means. The server may also include a processing means 126. The processing means may be any of a variety of technological devices suitable for processing queries and for performing other data processing tasks.

The system 102 further includes one or more clients 128. Each client may be any of a wide variety of systems configured to access resources 106, 108, 110 via the interconnection means 104. The client may be operated by a user 130. A client may be implemented in hardware, in software or a combination thereof. A client may be a general purpose computer. Such a computer may be based on a general purpose operating system such as Windows®, Mac OS® or Linux®. Windows is a registered trademark of Microsoft Corporation, Redmond, Wash. United States in the United States and other countries. Mac OS is a registered trademark of Apple Inc., Cupertino, Calif. United States. Linux is the registered trademark of Linus Torvalds in the United States and other countries. A client may also be a device other than a general purpose computer. Such devices may include home entertainment systems, kiosks specifically designed to facilitate Internet access, mobile telephones and personal digital assistants (PDA's).

A client 128 may be persistently or intermittently connected to the interconnection means 104. For example, the client may be persistently connected to the Internet via a DSL connection. As another example, the client may be intermittently connected to the Internet via a dial-up connection. The client may include a network interface means 132. The network interface means may be any of a variety of technological devices configured to allow the client to receive data from the interconnection means 104 and to transmit data to the interconnection means.

A client 128 may also include input means 134 to receive information from a user 130. Input means 134 may include a keyboard, a mouse, a touchpad and a voice recognition system. The client may also include output means 136 to transmit information to a user. Output means 136 may include a display and a speaker. The client may also include processing means 138. The processing means may include a microprocessor and other integrated circuits (IC's).

A client 128 may comprise a web browser 140. A web browser is a technological device configured to facilitate access to the World Wide Web. The web browser may be a computer program product such as Internet Explorer®, FIREFOX®, Opera®, Safari™ or Konqueror™. Internet Explorer is a registered trademark of Microsoft Corporation, Redmond, Wash. United States in the United States and other countries. Firefox is a registered trademark of the Mozilla Foundation, Mountain View, Calif. United States. Opera is a registered trademark of Opera Software ASA, Oslo, Norway. Safari is a trademark of Apple Inc., Cupertino, Calif. United States. Konqueror is a trademark of KDE e.V., Tübingen, Germany.

A client 128 may also comprise an electronic mail client 142. An electronic mail client is a technological device configured to process electronic mail messages. The electronic mail client may be a computer program product such as Outlook® or THUNDERBIRD™. Outlook is a registered trademark of Microsoft Corporation in the United States and other countries. Thunderbird is a trademark of the Mozilla Foundation, Mountain View, Calif. United States.

The web browser 140 and electronic mail client 142 may be extensible via plug-ins. Plug-ins are technological devices which add additional functionality to a computer program product.

In the exemplary system of FIG. 1, a client 128 receives from a user 130 a request 144 to access the URL "http://www.ibm.com/". Those skilled in the art will appreciate that in the prior art, a web browser 140 would simply retrieve the resource 106 identified by the specified URL. However, the exemplary web browser has been modified to implement the method of the present invention. Accordingly, the client 128 may transmit a query 146 containing the URL "http://www.ibm.com/" to the server 118. The server then determines the identity of the entity, if any, associated with the URL. In this case, the URL is associated with the entity 112 International Business Machines Corporation. The server therefore transmits to the client a query result 148 comprising the identity of the entity. The identity of the entity may be transmitted as an identity string. The client advises the user 130 of the identity of the entity associated with the URL and prompts the user to select whether or not to access the resource 106 associated with the URL. If the user specifies that the resource should be accessed, the client transmits an HTTP request 150 to retrieve the resource. The client then receives a response 152 and renders the response so that it is available to the user. Rendering the response may comprise formatting the response on a display or another visual medium. However, the response may be rendered in a non-visual manner. For example, the response may be an audio file, or a standard HTML page may be rendered in audio form for the benefit of a user with a visual impairment.

A client 128 may cache the decisions of a user 130 as to whether or not to access a particular resource. This is advantageous because once a user has indicated that they trust a particular entity and/or resource, it is unnecessary to repeat the question and it costs the user time to do so. For example, the client 128 may store the fact that the user decided to access the URL "http://www.ibm.com/". If the user subsequently requests a resource with a domain name of "ibm.com" or a subdomain thereof or a resource otherwise known to be associated with International Business Machines Corporation, the client may omit prompting the user to select whether or not to access the resource.

FIGS. 2A-2D demonstrate an exemplary flowchart of operations for a user to verify that a network resource address is trusted.

Figure 2A:
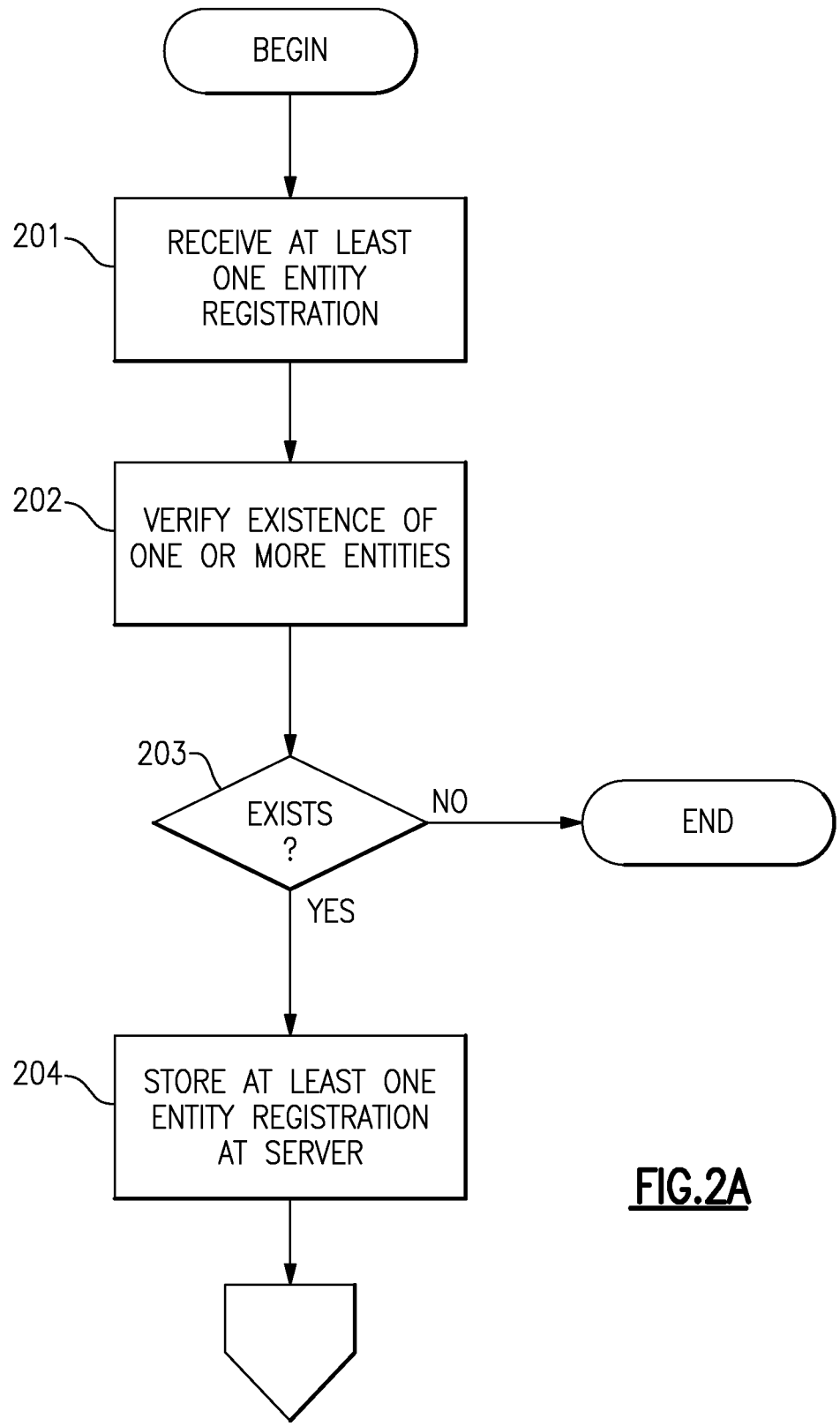
FIGS. 2A, 2B, 2C and 2D demonstrate an exemplary flowchart of operations for a user to verify that a network resource address is trusted.

FIG. 2A demonstrates operations which may be performed at a server. The operations may be performed by a known authority. In an embodiment of the present invention, the operations shown in FIG. 2A are performed by BBBOnLine®, Inc, a project of the Council of Better Business Bureaus®. BBBOnLine and Better Business Bureau are registered trademarks of the Council of Better Business Bureaus, Inc., Arlington, Va. United States.

At receiving operation 201, at least one entity registration is received. Each entity registration comprises an identity of an entity and entity addressing information associated with the identity of the entity. The identity of the entity may comprise an identity string containing textual information identifying the entity. Entity addressing information may comprise one or more domain names. Entity addressing information may also include one or more Internet Protocol addresses and/or one or more ranges of Internet Protocol addresses. It is contemplated that all entity addressing information associated with an identity of an entity is stored in a single entity registration. For example, an entity registration may include the identity string "International Business Machines Corporation", the domain name "ibm.com", a range of IP addresses wherein the first 8 bits are decimal 9 and any other domain name, IP address or range of IP addresses associated with IBM.

An entity registration may have been transmitted by the entity included in the entity registration. This advantageously allows an entity to register itself, thus electing to participate in validation as contemplated by the present invention.

At verifying operation 202, the existence of at least one entity received at receiving operation 201 is confirmed. A variety of methods may be employed to confirm the existence of the entity. For example, a physical location associated with the entity, such as an office or a storefront, may be visited in person to confirm that it exists. In the case of a legal person such as a corporation or an LLC, the existence and the valid status of the legal person may be confirmed with the relevant governmental jurisdiction.

Verifying operation 202 also includes verifying that entity addressing information associated with an identity of an entity actually belongs to the entity. For example, if an entity registration includes the identity string "International Business Machines Corporation", the domain name "ibm.com"

and the IP address "9.11.22.33", verifying operation 202 may include verifying that this combination of domain name and IP address in fact belong to the legal person known as International Business Machines Corporation.

More generally, verifying operation 202 may seek to confirm that the at least one entity can be trusted. To achieve this goal, verifying operation 202 may comprise confirming that an entity meets predefined criteria designed to ensure trust. For example, the number of complaints regarding an entity may be required to be less than a predefined threshold.

At determining operation 203, it is determined whether the conditions checked by verifying operation 202 were confirmed. If the entity is confirmed to exist and is not determined not to be trusted, processing continues with storing operation 204. Otherwise, processing of the entity registration terminates, as only entities which are confirmed to exist and not determined not to be trusted should be stored at the server.

At storing operation 204, the at least one entity registration received at receiving operation 201 is stored at a server.

It is noted that receiving operation 201, verifying operation 202, determining operation 203 and storing operation 204 may be performed at any time. In fact, it is contemplated that these operations are repeated as new entities register themselves with the known authority.

Figure 2B:
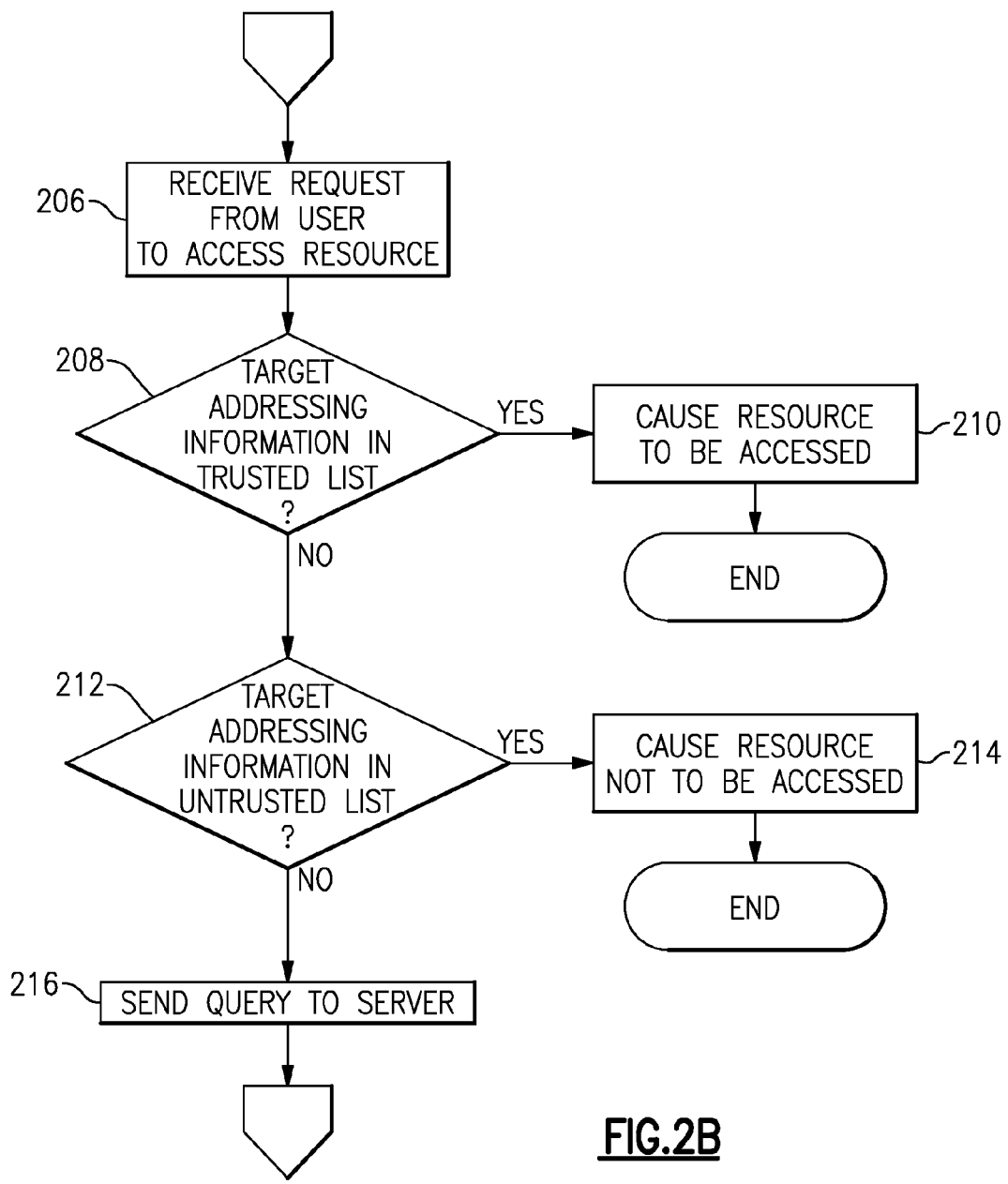

The exemplary sequence of operations continues in FIG. 2B. The operations demonstrated in FIG. 2B may be performed by a verification unit located at a client.

At receiving operation 206, a request is received from a user to access a resource locatable via target addressing information. The target addressing information may be a Uniform Resource Locator (URL). The resource may be any of the resource types listed in the discussion in FIG. 1.

At determining operation 208, it is determined whether the target addressing information is included in a trusted list. A trusted list includes addressing information of resources which have already been determined to be trusted. Further details about the trusted list are provided in the discussion of FIG. 3. If the target addressing information is included in the trusted list, control passes to accessing operation 210. Otherwise, control passes to determining operation 212.

At accessing operation 210, the resource is caused to be accessed. Accessing operation 210 may comprise accessing the resource. Accessing operation 210 may also comprise causing another technological device, such as a web browser, to access the resource. Once the resource has been accessed, processing of the request is complete.

At determining operation 212, it is determined whether the target addressing information is included in an untrusted list. An untrusted list includes addressing information of resources which have already been determined not to be trusted. Further details about the untrusted list are provided in the discussion of FIG. 3. If the target addressing information is included in the untrusted list, control passes to blocking operation 214. Otherwise, control passes to sending operation 216.

Figure 4B:
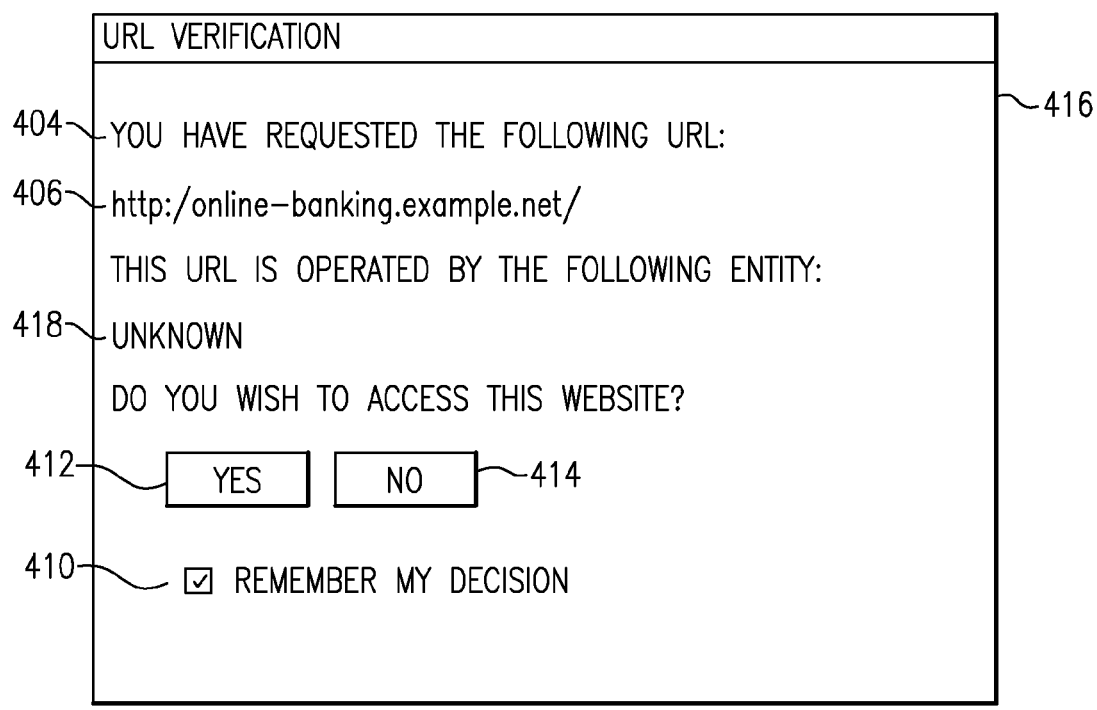
Figure 4C:
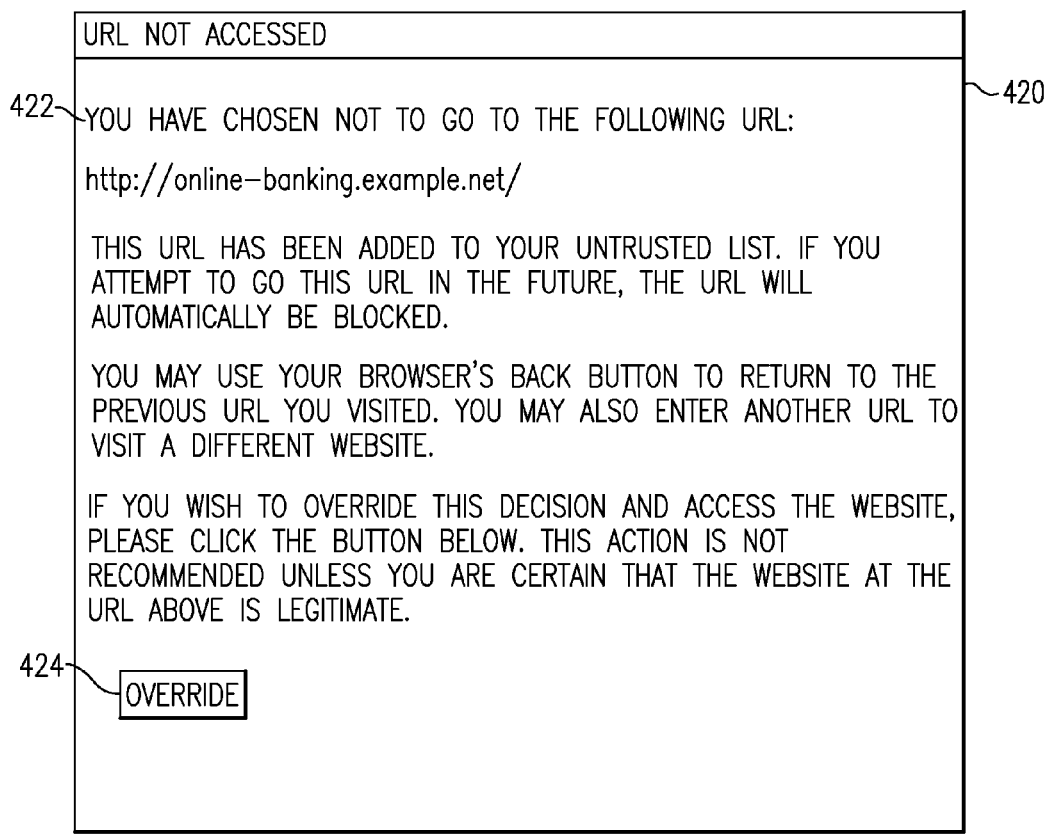
Figure 4D:
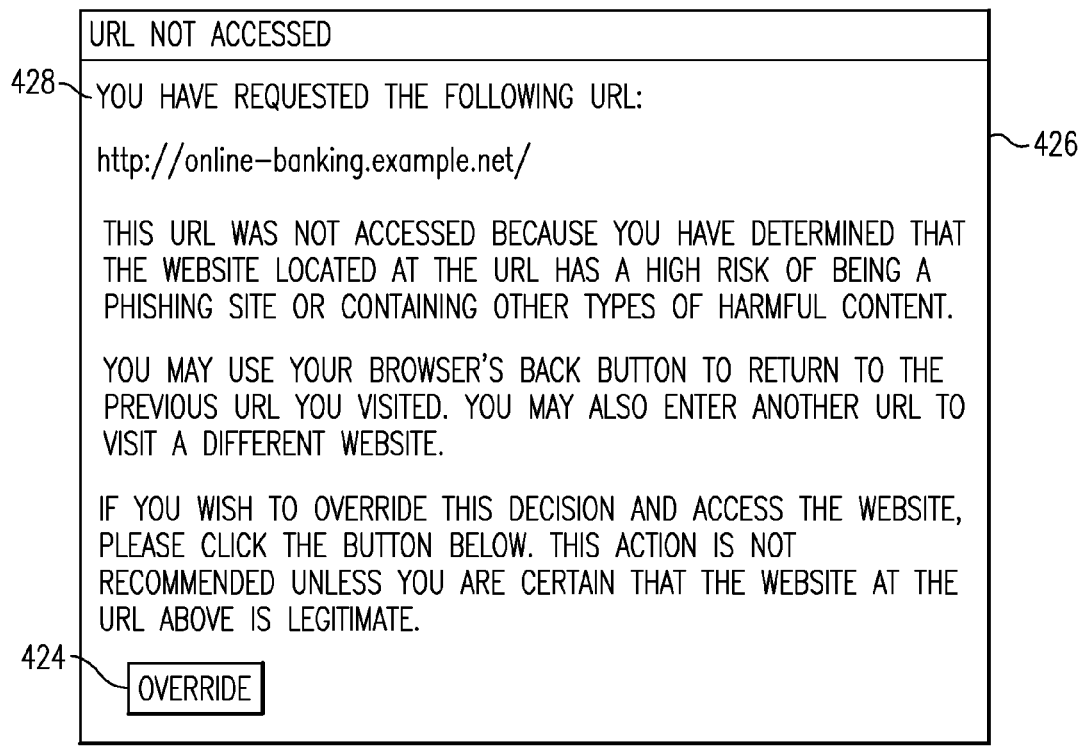

At blocking operation 214, the resource is caused not to be accessed. Blocking operation 214 may comprise displaying a message to the user who submitted the request to indicate that the resource was not accessed. FIG. 4D shows an exemplary message which may be displayed for this purpose. Once the message has been displayed, processing of the request is complete.

In an embodiment of the present invention, blocking operation 214 causes the resource to be accessed but blocks specific functionality associated with the resource. A resource included in the untrusted list may be accessed but may be prevented from causing executable code to be executed at a client. Types of executable code which may be blocked may include JavaScript, Java and ActiveX. Additionally, attempts to submit data to the resource may be blocked. In particular, submitting data to the resource via HTML forms may be blocked. This beneficially prevents an untrusted resource from receiving sensitive information such as credit card numbers or passwords while allowing passive, low-risk content from an untrusted resource to be viewed.

At sending operation 216, a query is sent to a server. The query comprises target addressing information included in the request received at receiving operation 206.

Figure 2C:
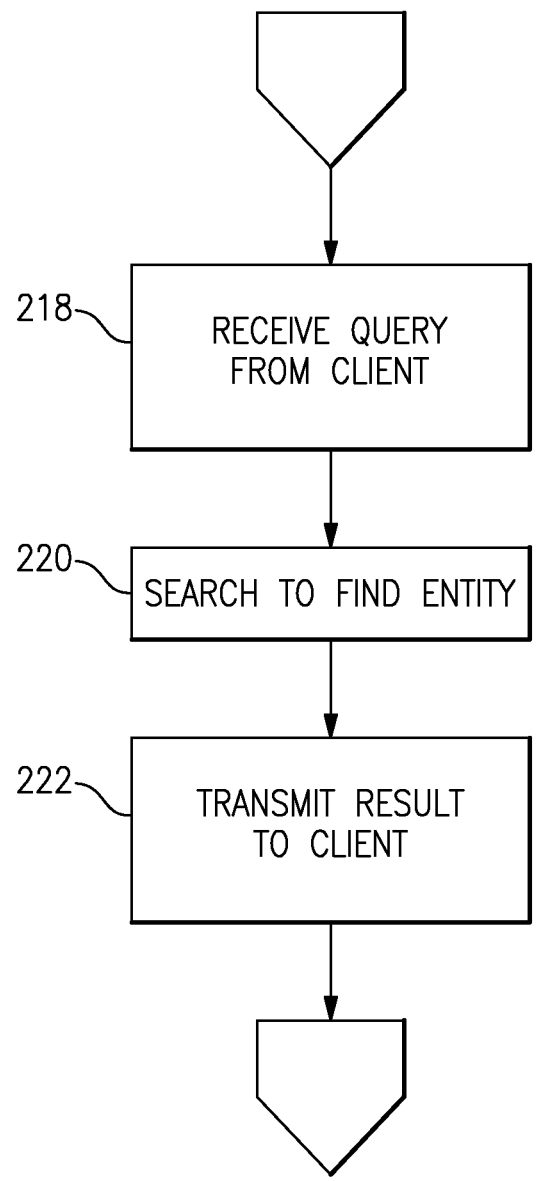

The exemplary sequence of operations continues in FIG. 2C. The operations demonstrated in FIG. 2C may be performed by a server.

At receiving operation 218, a query comprising a target addressing information is received from a client. After receiving operation 218 is completed, control passes to searching operation 220.

At searching operation 220, a search is performed to attempt to associate the target addressing information with an entity. The search may attempt to match target addressing information with entity addressing information included in entity registrations stored at storing operation 204. If the target addressing information matches entity addressing information, searching operation 220 comprises determining the identity of the entity associated with the entity addressing information. Searching operation 220 may alternatively determine that the target addressing information does not match any entity addressing information.

At transmitting operation 222, the result of searching operation 220 is transmitted to the client. If the target addressing information matched entity addressing information, transmitting operation 222 transmits to the client a result comprising the identity of the entity associated with the entity addressing information matching the target addressing information. The identity of the entity may be transmitted as an identity string. The result may also include all entity addressing information associated with the entity. If no entity addressing information matched the target addressing information, transmitting operation 222 transmits to the client an indication that no entity is associated with the target addressing information.

Figure 2D:
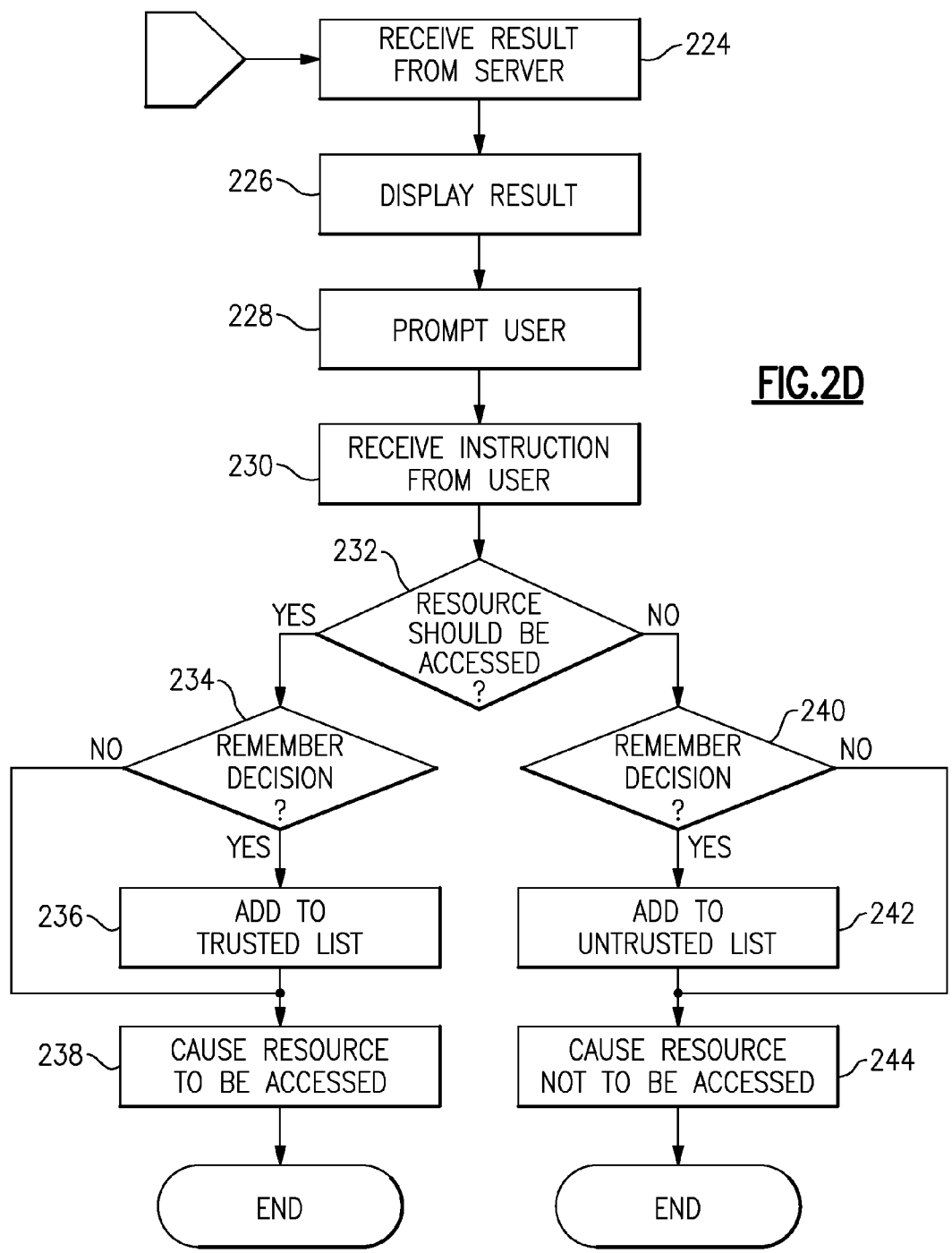

The exemplary sequence of operations continues in FIG. 2D. The operations demonstrated in FIG. 2D may be performed by the verification unit which performed the operations demonstrated in FIG. 2B.

At receiving operation 224, the result transmitted in transmitting operation 222 is received. After receiving operation 224 is completed, control passes to displaying operation 226.

At displaying operation 226, the result received at receiving operation 224 is displayed. If an identity of an entity was received, the identity is displayed. FIG. 4A shows an exemplary message for displaying an identity of an entity. If an indication that no entity is associated with the target addressing information was received, a message is displayed to communicate this fact. FIG. 4B shows an exemplary message for displaying an indication that no entity is associated with the target addressing information.

At prompting operation 228, the user is prompted to select whether or not to access the resource. Prompting operation 228 may be performed regardless of whether or not an identity of an entity was received. Prompting operation 228 may also comprise offering an option to select whether or not to remember the decision.

At receiving operation 230, an instruction is received from the user specifying whether or not to access the resource. The instruction may also specify whether or not to remember the decision.

At determining operation 232, it is determined whether or not the instruction specified that the resource should be accessed. If it is determined that an instruction to access the resource was received, control passes to determining operation 234. If it is determined that an instruction not to access the resource was received, control passes to determining operation 240.

At determining operation 234, it is determined whether or not the instruction specified that the decision should be remembered. If it is determined that the instruction specified that the decision should be remembered, processing continues with adding operation 236. Otherwise, control passes to accessing operation 238.

At adding operation 236, the target addressing information is added to the trusted list. If the result received at receiving operation 224 comprises an identity of an entity, the identity of the entity may also be added to the trusted list. Furthermore, if the result comprises entity addressing information, the entity addressing information may also be added to the trusted list.

At accessing operation 238, the resource is caused to be accessed. Accessing operation 238 may comprise accessing the resource. Accessing operation 238 may also comprise causing another system, such as a web browser, to access the resource. Once the resource has been accessed, processing of the request is complete.

At determining operation 240, it is determined whether or not the instruction specified that the decision should be remembered. If it is determined that the instruction specified that the decision should be remembered, processing continues with adding operation 242. Otherwise, control passes to blocking operation 244.

At adding operation 242, the target addressing information is added to the untrusted list. If the result received at receiving operation 224 comprises entity addressing information, the entity addressing information may also be added to the trusted list.

At blocking operation 244, the resource is caused not to be accessed. Blocking operation 244 may comprise displaying a message to the user to confirm that the resource was not accessed. FIG. 4C shows an exemplary message which may be displayed for this purpose. Once the message has been displayed, processing of the request is complete.

In an embodiment of the present invention, blocking operation 244 causes the resource to be accessed but blocks specific functionality associated with the resource. Blocking specific functionality may include any of the possibilities listed regarding blocking operation 214.

Figure 3:
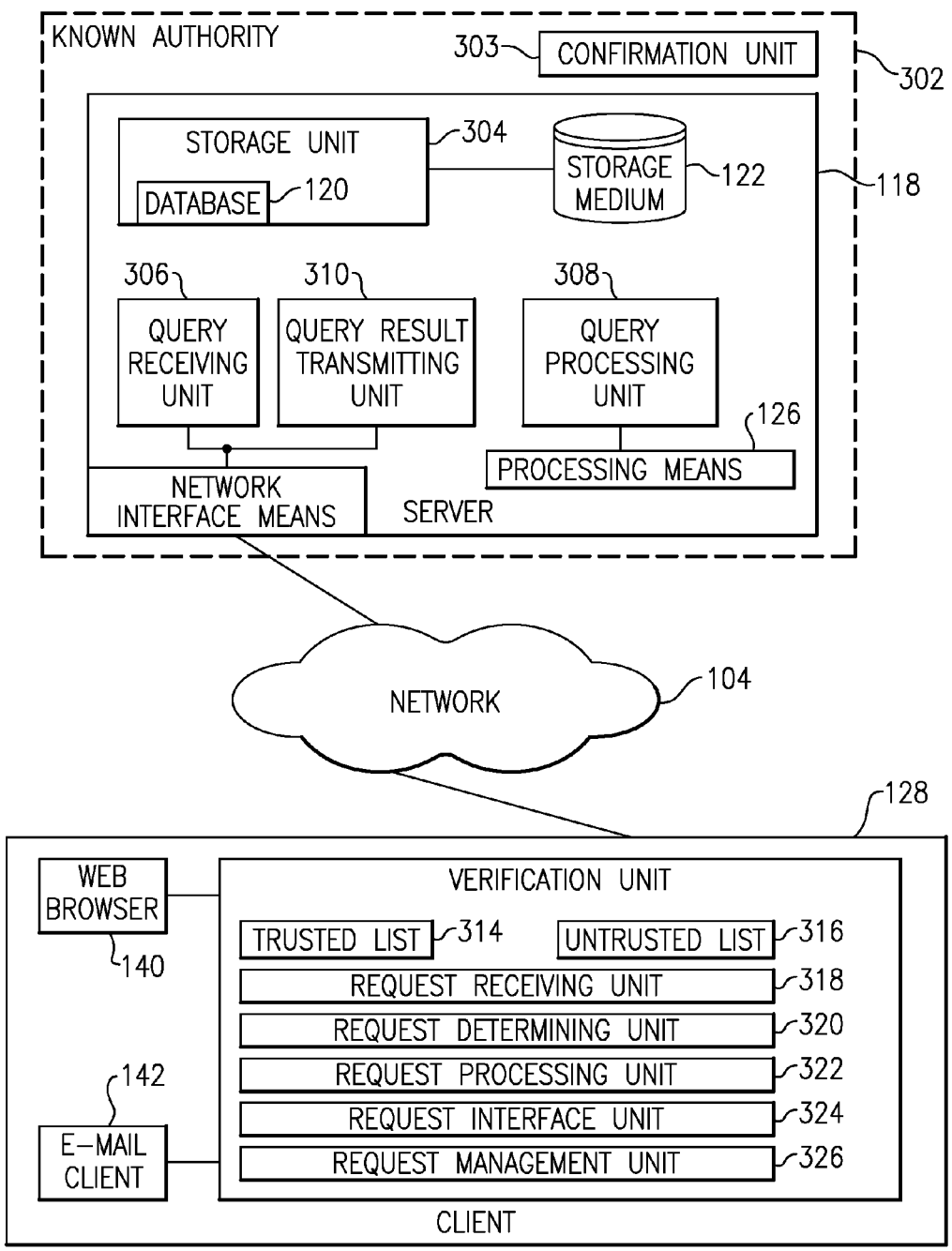
FIG. 3 provides additional detail about an exemplary system for a user to verify that a network resource address is trusted as contemplated by the present invention.

Turning now to FIG. 3, additional detail is provided about an exemplary system for a user to verify that a network resource address is trusted as contemplated by the present invention.

The exemplary system includes at least one server 118. The server comprises a plurality of units. Further detail about the server was discussed regarding FIG. 1. The server may be connected to an interconnection means 104. The server may be connected to at least one client 128 via the interconnection means. Each of the units described below may be implemented in hardware, software or a combination thereof. Thus, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The server 118 is operated by a known authority 302. The known authority ensures the quality of the entity registrations stored at the server. To achieve this goal, the known authority includes a confirmation unit 303. The confirmation unit is configured to confirm the existence of entities for which the identities are included in the entity registrations. The confirmation unit is further configured to verify that entity addressing information associated with an identity of an entity actually belongs to the entity. The confirmation unit may be configured to perform any of the techniques listed above regarding verifying operation 202.

In an embodiment of the present invention, the known authority is the Better Business Bureau OnLine, Inc. This organization currently provides a service allowing businesses to register their websites and their company information. The service grants a reliability seal to companies which are confirmed to exist and which meet specific minimum standards. In a further embodiment of the present invention, the information collected by this service is extended to include domain names, IP addresses and ranges of IP addresses.

The server 118 comprises a storage unit 304. The storage unit is configured to store at least one verified entity registration. Each entity registration comprises an identity of an entity and entity addressing information associated with the identity of the entity. To facilitate displaying information to users, the identity of the entity may include the entity's name. Entity addressing information may comprise one or more domain names. Entity addressing information may also comprise one or more Internet Protocol addresses and/or one or more ranges of Internet Protocol addresses. Ranges of IP addresses may be expressed using a prefix having an arbitrary number of bits. It is emphasized, however, that IP addresses need not be expressed in terms of ranges. In particular, the entity addressing information of a single entity registration may include large numbers of individual IP addresses. An entity registration may additionally include data regarding the entity than the specific types of data outlined above. The storage unit may comprise a database 120. The storage unit and/or the database may employ a storage medium 122 to store the at least one entity registration.

In an embodiment of the present invention, entity addressing information may comprise a specification that both a domain name and an IP address must match target addressing information in order for the entity addressing information to be considered to match the target addressing information. Such a specification may apply to all entity addressing information in an entity registration. Such a specification may also apply only to specific elements of entity addressing information. For example, entity addressing information may specify that any IP address whose first 8 bits are decimal 9 matches regardless of the domain name and may further specify that a match occurs when both the domain name is "ibmconferenceregistration.example.com" and the IP address is "192.0.2.50".

The server 118 further comprises a query receiving unit 306. The query receiving unit is configured to receive from a client a query comprising target addressing information. The target addressing information may comprise an IP address. The target addressing information may also comprise a domain name. The query receiving unit may receive the query via a network interface means 124.

The server 118 further comprises a query processing unit 308. The query processing unit is configured to perform a search to attempt to associate the target addressing information in the received query with an entity. The search may attempt to match the target addressing information with entity addressing information stored at the storage unit 304. The query processing unit is further configured to determine the identity of the entity associated with the entity addressing information if the target addressing information matches the entity addressing information. The query processing unit may alternatively determine that the target addressing information does not match any entity addressing information. The query processing unit may employ a processing means 126 to perform these functions.

If multiple elements of target addressing information are received, a search may be performed on all or a plurality of the received elements of addressing information. In particular, if both a domain name and an IP address are received, the search may be performed on both the domain name and the IP address. Additionally, if a domain name is received but no IP address is received, a Domain Name Service (DNS) lookup may be performed on the domain name to obtain the IP address. The search may then be performed on both the domain name and the IP address.

In an embodiment of the present invention, the query processing unit 308 is configured to associate the target addressing information with entity addressing information only when a domain name in the target addressing information matches a domain name in the entity addressing information and when an IP address in the target addressing information matches an IP address or a range of IP addresses in the same entity addressing information. The query processing unit may apply this rule uniformly. The query processing unit may also apply this rule only when entity addressing information includes a specification that both a domain name and an IP address must match target addressing information. As previously noted, such specifications may only apply to specific elements of addressing information. In such cases, the query processing unit only applies this rule in regards to the specified elements of addressing information. This embodiment beneficially allows validating websites and other services executing in shared hosting environments.

The query processing unit 308 may be further configured to determine whether the target addressing information is included in a range of Internet Protocol addresses associated with the identity of the entity. Ranges of IP addresses may be defined by a prefix having an arbitrary number of bits. In such cases, a match may be considered to exist if the first n bits of an IP address in the target addressing information match the prefix, where n is the length of the prefix in bits. For example, suppose a mid-sized business has been assigned a block of IP addresses wherein all addresses begin with the same 18-bit prefix. The 18-bit prefix would thus have been stored in the entity addressing information for this business. A match with this business is therefore considered to exist if the first 18 bits of an IP address in the target addressing information matches the 18-bit prefix.

Target addressing information comprising IP addresses may match a plurality of entity registrations in some cases. For example, an ISP may be assigned all IP addresses beginning with a certain 16-bit prefix. The exemplary ISP thus has an entity registration whose entity addressing information comprises the 16-bit prefix. The ISP may, from its network, sub-assign a range of IP addresses defined by a 25-bit prefix to a specific business which is one of its customers. Thus, the exemplary business has an entity registration whose entity addressing information comprises the subnetwork defined by the 25-bit prefix. In this case, target addressing information comprising an IP address which is included in the business's network will match both the business's entity and the ISP's entity. To resolve such conflicts, the query processing unit 308 may be configured to associate the target addressing information with the most specific entity addressing information matching the target addressing information. In the preceding example, the target addressing information would be associated with the business because the business's addressing information is more specific than the ISP's addressing information. Entity addressing information defined by a longer prefix may be considered more specific than entity addressing information defined by a shorter prefix.

The query processing unit 308 may be further configured to process target addressing information comprising domain names. Domain names in target addressing information may be evaluated from right to left. Evaluation may begin with the top-level domain. Evaluation may also begin with the second-level domain, e.g., the immediate subdomain of the TLD. If the resulting domain name matches a domain name found in entity addressing information, a match is considered to exist with that entity addressing information. Otherwise, the next most specific subdomain (e.g., the next one to the left) may be considered. This process may be repeated until a match occurs or until the full domain name has been considered.

For example, if the target addressing information includes the domain name "www.ibm.com", the query processing unit 308 may search for entity addressing information matching the domain name "com". It is contemplated that TLD's such as "com" are not found in entity addressing information because of their broad scope. Because no match was found, the query processing unit may instead search for the next most specific subdomain of the target addressing information, namely "ibm.com". If an entity registration for International Business Machines Corporation includes the entity addressing information "ibm.com", the identity of the entity would be determined to be International Business Machines Corporation.

Target addressing information comprising multiple types of addressing information may potentially match a plurality of entity registrations. For example, if target addressing information comprises both an IP address and a domain name, the IP address may match the entity addressing information of a first entity registration while the domain name may match the entity addressing information of a second entity registration. In an embodiment of the present invention, this type of conflict is resolved by determining the identity of the entity whose entity addressing information matches the IP address. In another embodiment of the present invention, this type of conflict is resolved by determining the identity of the entity whose entity addressing information matches the domain name.

The server 118 further comprises a query result transmitting unit 310. The query result transmitting unit is configured to transmit to a client 128 a result comprising the identity of the entity associated with the entity addressing information matching the target addressing information. The identity maybe transmitted as an identity string. An identity string may contain textual information identifying the entity, such as the name of a corporation or the name of an owner of a business. The result may also include all entity addressing information associated with the entity. The result may additionally include any other information found in the entity registration of the entity.

The query result transmitting unit 310 is further configured to transmit to a client an indication that no entity is associated with the target addressing information if no entity addressing information matches the target addressing information. In an embodiment of the present invention, the indication is a Null value. Null is a construct available in many programming languages and environments known in the art which indicates the absence of data. In particular, Null commonly signifies that no data exists in a context, such a specific field, where that data would normally exist.

The exemplary system further includes a client 128. Further detail about the client was discussed regarding FIG. 1. As previously noted, the client may include a web browser 140. The client may also include an electronic mail client 142.

The client 128 comprises a verification unit 312. The verification unit may be implemented in hardware, software or a combination thereof. The verification unit may be implemented in any of a variety of computer languages, including without limitation C, C++, Java, JavaScript and machine language. The verification unit is configured to transmit a query comprising target addressing information. The verification unit is further configured to receive a result comprising the identity of the entity associated with the entity addressing information matching the target addressing information. The verification unit is additionally configured to receive an indication that no entity is associated with the target addressing information.

In an embodiment of the present invention, the verification unit 312 is a plug-in. Plug-ins are computer program products which are designed to be tightly coupled to another computer program product. Plug-ins typically modify the behavior, potentially including the core functionality, of the computer program product to which they are coupled.

The verification unit 312 may be coupled to a web browser 140. This beneficially allows the verification unit to be seamlessly integrated with the core functionality of the web browser. In particular, the web browser and verification unit may be configured so that the web browser passes control to the verification unit when a URL is requested. This may include both URL's which are manually entered by a user and URL's embedded in hyperlinks clicked by a user. A verification unit may be added to an existing web browser installation. A verification unit may also be included as a standard component of a web browser.

The verification unit 312 may also be coupled to an electronic mail client 142. In an embodiment of the present invention, the verification unit analyzes hyperlinks included in electronic mail messages. The electronic mail client and verification unit may be configured so that the web browser passes control to the verification unit when a request to read an electronic mail message is received. The verification unit may then process each hyperlink included in the electronic message, processing the addressing information embedded in the hyperlink as target addressing information. The verification unit may take a wide variety of actions when an identity of an entity matching the target addressing information is transmitted by the server. For example, the identity of the entity associated with the hyperlink may be displayed adjacent to the hyperlink or in a pop-up message appearing when a cursor is placed over the hyperlink. As another example, the hyperlink may be left unmodified. Similarly, the verification unit may take a wide variety of actions when an indication that no entity is associated with the addressing information is transmitted by the server. For example, a prominent message that the entity associated with the hyperlink is unknown may be displayed adjacent to the hyperlink or in a pop-up message appearing when a cursor is placed over the hyperlink. If a user attempts to click such a hyperlink, a pop-up window may be displayed warning that the entity associated with the hyperlink is unknown and prompting the user to confirm whether he or she actually wishes to follow the hyperlink. Hyperlinks which are not associated with a known entity may also be disabled so that they cannot be followed.

In another embodiment of the present invention, the verification unit 312 is coupled to an electronic mail client 142 in order to verify addressing information related to incoming electronic mail messages. Specifically, the verification unit may determine the identity of the entity associated with target addressing information associated with an incoming electronic mail message. It is noted that electronic mail messages transmitted via the Internet may include multiple types of addressing information, such as the address of a sender and the address of one or more hosts which transmitted the message. The verification unit may process any or all addressing information related to the message as target addressing information. For example, the verification unit may process both the domain name of the sender's address and the domain name of the host used to send the message as target addressing information.

The verification unit 312 may also be coupled to other types of computer program products. For example, the verification unit may be coupled to a File Transfer Protocol (FTP) client. Broadly speaking, the verification unit may be coupled to any computer program product which accesses Internet hosts.

It is noted that "spam" electronic mail messages frequently comprise addressing information which is obscure or even invalid. The present invention may be applied to automatically detect and handle spam messages. In an embodiment of the present invention, if an indication that no entity is associated with the target addressing information associated with an electronic mail message is received, the electronic mail message is moved to a separate folder designated for messages suspected of being spam.

It is further noted that electronic mail messages containing harmful content such as viruses and malware also frequently comprise obscure or invalid addressing information. Thus, in another embodiment of the present invention, if an indication that no entity is associated with the target addressing information associated with an electronic mail message is received, the electronic mail message is flagged. If a user attempts to read the message which is flagged, an alert may be provided to advise the user that the message is from an untrusted source. The alert may be any of a variety of user interface elements, including without limitation warning messages, dialog boxes and audible signals. The user may then be asked to specify whether or not they wish to access the message.

The verification unit 312 may be highly configurable. A configuration setting may be provided to allow toggling whether or not verification is enabled. If verification is not enabled, a web browser may directly access requested URL's without employing the method of the present invention. Another configuration setting may be provided to allow specifying the addressing information of the server 118. This may allow a user to select a server which is geographically proximate, thus reducing the time required to contact the server. It may also allow a user to specify an alternate server if a preferred server is unavailable. It is emphasized that the configuration settings provided need not be limited to those described above.

The verification unit 312 further contains a trusted list 314. The trusted list is configured to store addressing information. When target addressing information is included in the trusted list, verification of the target addressing information according to the method of the present invention may be omitted. Thus, the trusted list beneficially reduces the bandwidth and time required for verification. The trusted list may be implemented in hardware, software or a combination thereof. The trusted list may be stored in any of a variety of storage media and data structures known in the art for storing data. In an embodiment of the present invention, the trusted list is stored as one or more cookies in a web browser 140.

Addressing information stored at the trusted list 314 may include IP addresses, ranges of IP addresses, domain names and URL's. Additionally, a trusted list may store information about entities. Entity information may include the identity of the entity. The identity of the entity may be stored as an identity string. This beneficially allows an entity name contained in the identity string to be displayed to a user. The trusted lists may also store associations between entities and their addressing information. However, it is noted that if a user opts to trust a resource even though its target addressing information is not associated with any entity, the target addressing information is added to the trusted list without being associated with any entity.

Data added to the trusted list 314 may persist for an indefinite period of time. However, a configuration option may be provided to allow a user to purge the trusted list 314. Purging the trusted list may remove all data from the list.

The verification unit 312 further contains an untrusted list 316. The untrusted list is configured to store addressing information. When target addressing information is included in the untrusted list, access to the resource may be blocked. Thus, the untrusted list beneficially reduces the risk of accessing resources which are known to be harmful. The untrusted list may be implemented in hardware, software or a combination thereof. The untrusted list may be stored in any of a variety of storage media and data structures known in the art for storing data. In an embodiment of the present invention, the untrusted list is stored as one or more cookies in a web browser 140.

Addressing information stored at the untrusted list 316 may include IP addresses, ranges of IP addresses, domain names and URL's. In an embodiment of the present invention, the untrusted list does not store information about entities. While it may be possible for a user to opt not to trust a resource associated with an entity with a known identity, it is contemplated that this decision will be the exception rather than the rule.

Data added to the untrusted list 316 may be automatically purged after a specific period of time. In an embodiment of the present invention, the untrusted list is automatically purged every 30 days. It is noted that phishing sites are typically active for between 5 and 30 days. A configuration setting may be provided to specify whether or not the untrusted list should be automatically purged. Another configuration setting may be provided to specify a time interval for which addressing information should remain on the untrusted list before being automatically purged.

The verification unit may further comprise a request receiving unit 318. The request receiving unit may be implemented in hardware, software or a combination thereof. The request receiving unit is configured to receive a request from a user to access a resource locatable via target addressing information. It is emphasized that the request need not have been directly transmitted from the user to the request receiving unit. For example, a user may transmit a request to a web browser 140 which retransmits the request to the request receiving unit.

The verification unit may further comprise a request determining unit 320. The request determining unit may be implemented in hardware, software or a combination thereof. The request determining unit may receive target addressing information from the request received by the request receiving unit 318. The request determining unit is configured to determine whether the target addressing information is included in the trusted list 314. The request determining unit is further configured to determine whether the target addressing information is included in the untrusted list 316. Determining whether the target addressing information is included in the trusted list and/or the untrusted list may be based on the target addressing information in its entirety. The determination may also be based on a subset of the target addressing information. Specifically, the trusted list and the untrusted list may be searched for only a domain name and/or IP address included in the target addressing information. Finally, the determination may be based on information derived from the target addressing information. In particular, a DNS lookup may be performed to translate a domain name included in target addressing information into an IP address. The determination may then be based on the IP address instead of, or in addition to, the domain name.

The verification unit may further comprise a request processing unit 322. The request processing unit may be implemented in hardware, software or a combination thereof. The request processing unit may receive target addressing information from the request received by the request receiving unit 318. The request processing unit may also receive the determination made by the request determining unit 320 as to whether the target addressing information is included in the trusted list 314 or the untrusted list 316. The request processing unit is configured to cause the resource to be accessed if the target addressing information is included in the trusted list. The request processing unit is further configured to cause the resource not to be accessed if the target addressing information is included in the untrusted list. The request processing unit is further configured to send a query to the server if the target addressing information is in neither the trusted list nor the untrusted list. The query may include the target addressing information in its entirety. The query may also include a subset of the target addressing information. For example, the query may include only the domain name portion of the URL even if the URL additionally contains path information indicating a specific resource. Finally, the query may include information derived from the target addressing information. In particular, a DNS lookup may be performed to translate a domain name included in target addressing information into an IP address. The query may then include the IP address instead of, or in addition to, the domain name.

The verification unit may further comprise a user interface unit 324. The user interface unit may be implemented in hardware, software or a combination thereof. The user interface unit is configured to display the identity of the entity included in the query result returned by the server. Specifically, an identity string included in the query result may be displayed. Such an identity string may include the name of the entity as well as other identifying information regarding the entity. An exemplary display of an identity of an entity is shown in FIG. 4A. Alternatively, if the server returned an indication that no entity is associated with the target addressing information, the user interface unit may display an appropriate message conveying this fact. An exemplary display of an indication is shown in FIG. 4B. The user interface unit is further configured to prompt the user to select whether or not to access the resource. The user interface unit is further configured to receive an instruction from the user specifying whether or not to access the resource.

The verification unit may further comprise a list management unit 326. The list management unit may be implemented in hardware, software or a combination thereof. The list management unit is configured to add the target addressing information for a resource to the trusted list 314 upon receiving an instruction to access the resource. If the target addressing information matched an entity, the list management unit may also add to the trusted list additional entity information included in the query result transmitted by the server. Additional information added may include the identity of the entity and any entity addressing information associated with the entity. The identity of the entity may be contained in an identity string. However, if any such entity addressing information is a superset of the target addressing information, adding the target addressing information itself may be omitted. This is because adding the entity addressing information will cause the target addressing information to be matched. Adding all entity addressing information associated with an entity beneficially allows trust to be extended to entire entities rather than individual hosts. Specifically, it allows addressing information which was not originally requested, but which is associated with the entity, to be noted as trusted.

The list management unit is further configured to add the target addressing information for a resource to the untrusted list 316 upon receiving an instruction not to access the resource. If the resource was associated with an identity of an entity, all entity addressing information associated with the entity may also be added to the untrusted list. As with the trusted list, if any such entity addressing information is a superset of the target addressing information, adding the target addressing information itself may be omitted.

Thus, the trusted list will generally contain entities which have been indicated as trusted by a user. Similarly, the untrusted list will generally contain entities which have been indicated as not trusted by a user. However, the list management unit 326 may additionally include functionality to add and remove data from the trusted list and the untrusted list. This functionality may advantageously facilitate network administration. For example, a corporation's network administrator may wish to add all addressing information for the corporation to the trusted list of each client owned by the corporation. Similarly, a network administrator may wish to add addressing information for websites which contravene corporate policy to the untrusted list.

FIGS. 4A, 4B, 4C and 4D demonstrate an exemplary user interface for a user to verify that a network resource address is trusted.

FIG. 4A shows an exemplary message 402 displayed to a user when a resource associated with a known entity is requested. The message may be an HTML page stored at a verification unit. The HTML page may be displayed inside a web browser window from which the resource was originally requested.

In the exemplary scenario described herein, various events precede the display of the message 402. Initially, a user requested a resource identified via the URL "http://www.ibm.com/". This URL is the home page of the main website of International Business Machines Corporation. A search was performed to determine whether the trusted list contained any addressing information matching "www.ibm.com". No such match was found. If such a match had existed, the message would not have been displayed because the URL would have been accessed without further verification. Another search was performed to determine whether the untrusted list contained any addressing information matching "www.ibm.com". Again, no such match was found. If such a match had existed, the message would not have been displayed because a message such as that shown in FIG. 4D would have been displayed instead. A query comprising the domain name "www.ibm.com" was then submitted to a server. In response to the query, the server transmitted an identity string containing the text "International Business Machines Corporation" to indicate the identity of the entity with which the URL is associated. The server may also have transmitted additional information related to the entity.

The message 402 comprises text 404 configured to explain to the user that the URL requested is associated with a known entity. It is emphasized that the wording shown in FIG. 4A is exemplary. Any wording which expresses the response from the server in a manner which is comprehensible to humans may be displayed in the message 402. Furthermore, while the exemplary message is in English, the message may be expressed in any human language. The message need not even be conveyed in a visual format. For example, the message may be expressed in audio for the benefit of a visually impaired user.

The text 404 may include the URL 406 requested by the user. This is advantageous because the actual URL embedded in hyperlinks is disguised in many phishing e-mails. Thus, a user may click a hyperlink which appears to point to "www.ibm.com" but actually points to a phishing website. Furthermore, some URL's are too long to be displayed in the space in the web browser window allocated for their display. Repeating the URL in the message thus ensures that the user can inspect the URL in its entirety.

The text 404 may also include an identity string 408 describing the identity of the entity associated with the URL as determined by the server. In particular, the identity string may include the name of the entity. The identity string may also include other relevant information about the entity. For example, if the entity is a business which operates primarily within a specific metropolitan area and which has a definable physical location such as a storefront, the identity string may include a physical address of the entity.

The message 402 further contains a checkbox 410 to indicate that the decision should be remembered. A checkbox is a graphical user interface element known in the art for allowing a user to toggle an option which can be expressed as a Boolean value. A checkbox may be checked to represent a state of truth or may be unchecked to represent a state of falsity. As with radio buttons, checkboxes are understood by the vast majority of Internet users because they are a standard element of HTML forms. It is contemplated that the checkbox is checked by default.

The message 402 further contains a Yes button 412 to specify that the URL should be accessed. The Yes button may be a form submit button. If the Yes button is clicked, the URL is caused to be accessed. Furthermore, if the checkbox 410 is checked, the identity of the entity and all entity addressing information associated with the entity may be added to the trusted list.

The message 402 further contains a No button 414 to specify that the URL should not be accessed. The No button may be a form submit button. If the No button is clicked, the URL is caused not to be accessed. A message such as the exemplary message shown in FIG. 4C may be displayed to communicate this fact. Furthermore, if the checkbox 410 is checked, the domain name and/or IP address of the URL is added to the untrusted list. Other entity addressing information associated with the entity may also be added to the untrusted list.

FIG. 4B shows an exemplary message 416 displayed to a user when a resource associated with an unknown entity is requested. As in FIG. 4A, the message may be an HTML page stored at a verification unit. The HTML page may be displayed inside a web browser window from which the resource was originally requested.

In the exemplary scenario described herein, various events precede the display of the message. Initially, a user requested a resource identified via the URL "http://online-banking.example.net/". This URL is a phishing website which impersonates the website of a major bank but is in fact operated by a computer criminal. As in FIG. 4A, the trusted list and untrusted list were searched for any addressing information matching "online-banking.example.net". A match was not found in either list. If it had been found in either list, the message would not have been displayed for the same reasons as in FIG. 4A. A query comprising the domain name "online-banking.example.net" was then submitted to a server. In response to the query, the server transmitted an indication that no entity is associated with the URL.

The message 416 includes text 404, the URL 406 which was requested, a checkbox 410 to indicate whether or not the decision should be remembered, a Yes button 412 to specify that the URL should be accessed and a No button 414 to specify that the URL should not be accessed. These elements may be similar in appearance and functionality to the corresponding elements in FIG. 4A. However, in place of the identity string is an indication 418 that the entity is unknown. The indication may be any text, symbol or other representation that communicates the indication transmitted by the server to a human user. In an embodiment of the present invention, the indication is the word "Unknown" displayed a space normally reserved for the identity string. The indication may be displayed in boldface and/or red for visual emphasis. For the benefit of foreign readers, it is noted that the color red is associated with danger in the American culture.

The Yes button 412 and the No button 414 may have similar effects to the corresponding elements in FIG. 4A. However, if the checkbox is checked 410, only the domain name and/or IP address of the URL may be added to the trusted list or the untrusted list. The identity of the entity and/or other entity addressing information cannot be added because no entity was matched.

It is emphasized that a user may wish to click the Yes button 412 even though the identity of the entity is unknown. For example, suppose the user requested the URL "http://joes-widgets.example.com/". This URL in reality is associated with the entity Joe's Widgets, LLC, a legitimate small business. If Joe's Widgets, LLC has not requested an entity registration, the server may return an indication that no entity is associated with the target addressing information. If the user is confident that he or she wishes to access the website, he or she may click the Yes button.

FIG. 4C shows an exemplary message 420 displayed to a user after the No button 414 is clicked. The message may include text 422 advising that the user chose not to access the URL. If the URL was added to the trusted list or the untrusted list, the message may also advise of this fact. The message may be an HTML page stored at a verification unit. The HTML page may be displayed inside a web browser window from which the resource which was caused not to be accessed was originally requested.

A user may accidentally cause a valid resource to be added to the untrusted list. Thus, the message 420 may also contain an Override button 424. The Override button may be a form submit button. Clicking the Override button causes the blocked resource to be accessed. Clicking the Override button may also cause the resource to be removed from the untrusted list.

FIG. 4D shows an exemplary message 426 displayed to a user when a URL is caused not to be accessed because it is included on the untrusted list. The message may include text 428 explaining that the URL was not accessed due to its inclusion on the untrusted list. The message may be an HTML page stored at a verification unit. The HTML page may be displayed inside a web browser window from which the resource which was caused not to be accessed was originally requested. The message may further include an Override button 424 similar in appearance and function to the corresponding element of FIG. 4C.

It is contemplated that the client 128 may be embodied as an general purpose computer. Some of the elements of such a computer are presented in FIG. 5, wherein a processor 502 is shown having an input/output (I/O) unit 504, a central processing unit (CPU) 506, and a main memory unit 508. The main memory unit 508 generally stores program instructions and data used by the processor 502. Instructions and instruction sequences implementing the present invention may, for example, be embodied in memory 508. Various types of memory technologies may be utilized in the main memory unit 508, such as Random Access Memory (RAM), Read Only Memory (ROM), and Flash memory.

Figure 5:
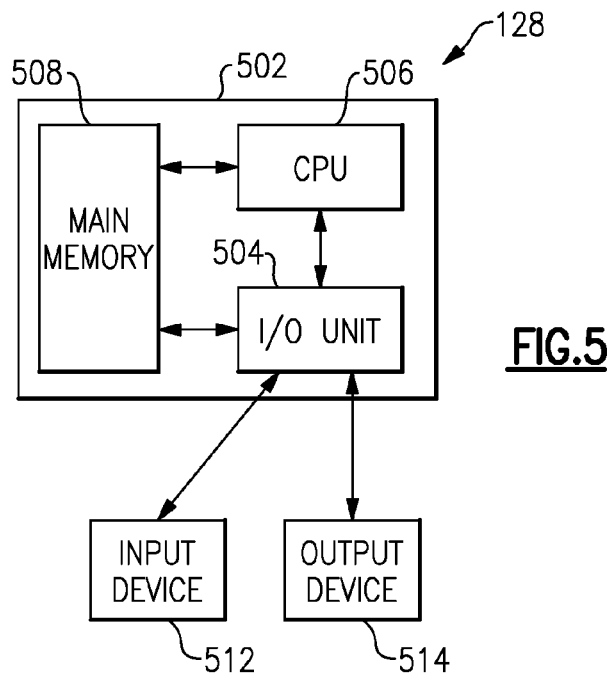
FIG. 5 shows an illustrative embodiment of a computer system embodying the present invention.

The I/O unit 504 connects with an input device unit 512 and an output device unit 514. The input device unit 512 may include input hardware such as keyword. The output device unit 514 may be output hardware such as a display. Arrows in FIG. 5 represent the system bus architecture of the computer, however, these arrows are for illustrative purposes only.

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

The invention claimed is:

1. A method for verifying a network resource address is trusted, the method comprising:
storing at a server at least one entity registration, each entity registration comprising an identity of an entity and entity addressing information associated with the identity of the entity;
confirming the existence of at least one entity for which the identity is included in the at least one entity registration by visiting in person a physical address associated with the entity registration;
receiving from a client a query comprising a target addressing information;
determining the identity of the entity associated with the entity addressing information if the target addressing information matches the entity addressing information;
transmitting to the client a result comprising the identity of the entity associated with the entity addressing information matching the target addressing information; and
transmitting to the client an indication that no entity is associated with the target addressing information if no entity addressing information matches the target addressing information;
receiving a request from a user to access a resource locatable via the target addressing information;
determining whether the target addressing information is included in a trusted list;
allowing the resource to be accessed if the target addressing information is included in the trusted list;
determining whether the target addressing information is included in an untrusted list;
allowing the resource not to be accessed if the target addressing information is included in the untrusted list; and
sending the query to the server if the target addressing information is in neither the trusted list nor the untrusted list.

2. The method of claim 1, wherein the entity addressing information includes at least one element selected from the group of Internet Protocol addresses, ranges of Internet Protocol addresses and domain names.

3. The method of claim 1, wherein determining if the target addressing information included in the query matches the entity addressing information comprises determining whether the target addressing information is included in a range of Internet Protocol addresses associated with the identity of the entity.

4. The method of claim 1, further comprising:
displaying the identity of the entity;
prompting the user to select whether or not to access the resource;
receiving an instruction from the user specifying whether or not to access the resource;
adding the target addressing information to the trusted list upon receiving an instruction to access the resource; and
adding the target addressing information to the untrusted list upon receiving an instruction not to access the resource.

5. The method of claim 1, wherein the identity of the entity is a text string of a business name.

6. A system for verifying a network resource address is trusted, the system comprising: a server comprising:
a storage unit configured to store at least one non-government entity registration, each non-government entity registration comprising an identity of a non-government entity and entity addressing information associated with the identity of the non-government entity;
a query receiver configured to receive from a client a query comprising a target addressing information;
a query processor configured to determine the identity of the non-government entity associated with the entity addressing information if the target addressing information matches the non-government entity addressing information; and
a query result transmitter configured to transmit to the client a result comprising the identity of the non-government entity associated with the entity addressing information matching the target addressing information and to transmit to the client an indication that no entity is associated with the target addressing information if no entity addressing information matches the target addressing information; and a processor configured to, for at least one entity registration, confirm the existence of the non-government entity for which the identity is included in the entity registration by comparing a government record for the non-government entity against the entity registration;

a verification transmitter configured to transmit the query comprising the target addressing information, to receive the result comprising the identity of the non-government entity associated with the entity addressing information matching the target addressing information and to receive the indication that no entity is associated with the target addressing information;

a trusted storage unit configured to store addressing information;

an untrusted storage unit configured to store addressing information a request receiver configured to receive a request from a user to access a resource locatable via the target addressing information;

a request processor configured to determine whether the target addressing information is included in a trusted list and whether the target addressing information is included in an untrusted list; and a request processor configured to cause the resource to be accessed if the target addressing information is included in the trusted list, to cause the resource not to be accessed if the target addressing information is included in the untrusted list and to send the query to the server if the target addressing information is in neither the trusted list nor the untrusted list.

7. The system of claim 6, wherein the entity addressing information includes at least one domain name.

8. The system of claim 6, wherein the entity addressing information includes at least one element selected from the group of Internet Protocol addresses and ranges of Internet Protocol addresses.

9. The system of claim 8, wherein the query processor is further configured to determine whether the target addressing information is included in the range of Internet Protocol addresses associated with the identity of the non-government entity.

10. The system of claim 6, further comprising:
a user interface configured to display the identity of the non-government entity, to prompt the user to select whether or not to access the resource and to receive an instruction from the user specifying whether or not to access the resource; and
a list management processor configured to add the target addressing information to the trusted list upon receiving an instruction to access the resource and to add the target addressing information to the untrusted list upon receiving an instruction not to access the resource.

11. A computer program product embodied in non-transitory computer readable memory comprising:
computer readable program codes coupled to the non-transitory computer readable memory for verifying a network resource address is trusted, the computer readable program codes configured to cause the program to:
store at a server at least one non-government entity registration, each non-government entity registration comprising an identity of a non-government entity and entity addressing information associated with the identity of the non-government entity;
confirm the existence of at least one entity for which the identity is included in the at least one entity registration by comparing a government record for the non-government entity against the entity registration;
receive from a client a query comprising a target addressing information;
determine the identity of the non-government entity associated with the entity addressing information if the target addressing information matches the entity addressing information;
transmit to the client a result comprising the identity of the non-government entity associated with the entity addressing information matching the target addressing information; and
transmit to the client an indication that no entity is associated with the target addressing information if no entity addressing information matches the target addressing information;
transmit the query comprising the target addressing information;
receive the result comprising the identity of the non-government entity associated with the entity addressing information matching the target addressing information;
receive the indication that no entity is associated with the target addressing information; and
receive a request from a user to access a resource locatable via the target addressing information;
determine whether the target addressing information is included in a trusted list;
cause the resource to be accessed if the target addressing information is included in the trusted list;
determine whether the target addressing information is included in an untrusted list;
cause the resource not to be accessed if the target addressing information is included in the untrusted list; and
send the query to the server if the target addressing information is in neither the trusted list nor the untrusted list.

12. The computer program product of claim 11, wherein the entity addressing information includes at least one domain name.

13. The computer program product of claim 11, wherein the entity addressing information includes at least one element selected from the group of Internet Protocol addresses and ranges of Internet Protocol addresses.

14. The computer program product of claim 13, further comprising program code configured to determine whether the target addressing information is included in the range of Internet Protocol addresses associated with the identity of the non-government entity.

15. The computer program product of claim 11, further comprising program code configured to:
display the identity of the non-government entity;
prompt the user to select whether or not to access the resource;
receive an instruction from the user specifying whether or not to access the resource;
add the target addressing information to the trusted list upon receiving an instruction to access the resource; and
add the target addressing information to the untrusted list upon receiving an instruction not to access the resource.

* * * * *